Aug. 24, 1926.

H. C. REED 1,597,329

SANITARY MILK BOTTLE HOLDER

Filed July 8, 1925

INVENTOR.
HASTINGS C. REED
BY
Shigley & Harney
ATTORNEYS

Patented Aug. 24, 1926.

1,597,329

UNITED STATES PATENT OFFICE.

HASTINGS C. REED, OF CEDARVILLE, OHIO.

SANITARY MILK-BOTTLE HOLDER.

Application filed July 8, 1925. Serial No. 42,244.

My present invention relates generally to sanitary milk bottle holders, and more particularly to a simple inexpensive device which will hold bottles of milk and protect the same from the sun and light as well as from the influence of flies, bugs and animals such as dogs and cats, and a still further object is the provision of a bottle protecting device providing for the ready insertion and removal of bottles, which may be made sufficiently inexpensive to warrant its use as an advertising device by milk supply concerns for distribution among the customers thereof.

Figure 1:
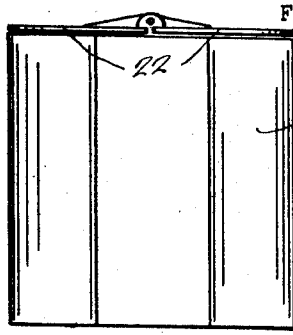
Figure 5:
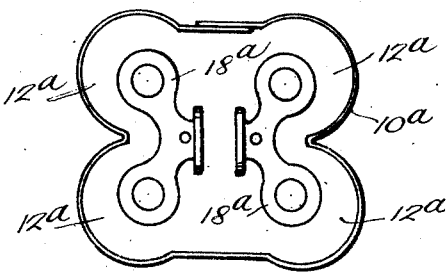
Figure 2:
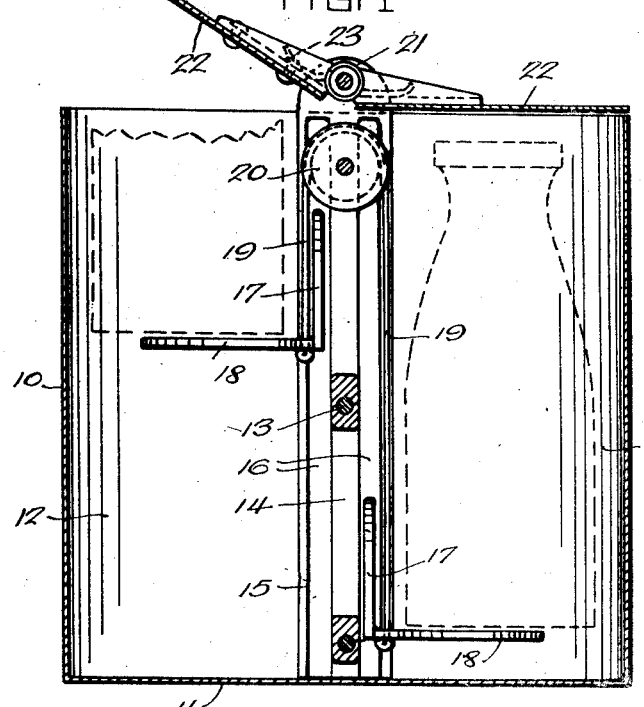
Figure 4:
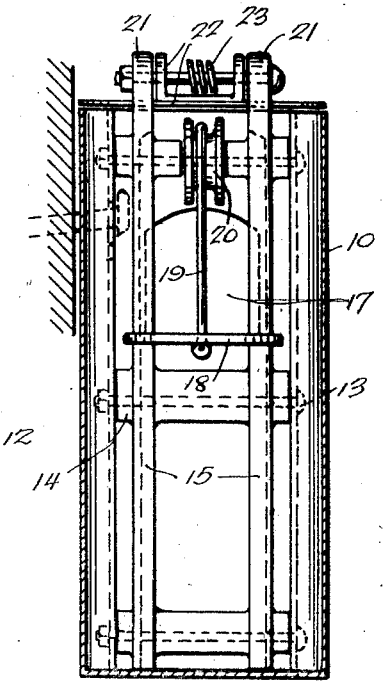
Figure 3:
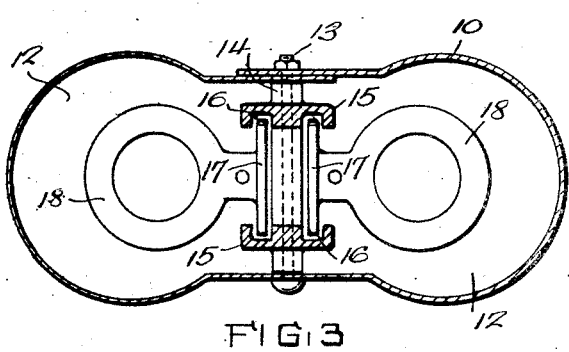

In the accompanying drawing which illustrates my present invention and forms a part of this specification, Figure 1 is a side view of the holder complete, Figure 2 is a central vertical section taken longitudinally therethrough, Figure 3 is a horizontal section taken therethrough, Figure 4 is a vertical section taken transversely therethrough, and Figure 5 is a top plan view illustrating a slightly modified form.

Referring now to these figures, and particularly to Figures 1 to 4 inclusive, my invention proposes a holder, the casing 10 of which may be formed of any suitable light sheet material, the casing having a base 11 and a pair of upright cylindrical bottle compartments 12 in communication with one another along their length and opened at their upper ends.

Secured transversely between the front and rear sides of the casing and preferably through these sides, as by means of bolts 13, is a frame generally indicated at 14 capable of bracing and supporting the entire casing. This frame 14 upstands within the casing centrally between the bottle compartments 12, and is provided with parallel laterally spaced track portions 15 whose opposing faces have vertical grooves 16 for the reception of the inner angular guide portions 17 of a pair of carriers 18 movable vertically in the bottle holding compartments 12. These carriers are in the form of plates on which the bases of the bottles rest, and to each carrier 18 is secured one end of a flexible connection or controlling cord 19 which extends between its ends over a roller 20 journaled within the upper portion of the supporting frame 14, as plainly seen in Figures 2 and 4. The controlling cord 19 is of such length as to elevate the bottle carrier 18 in one compartment when the carrier 18 in the other compartment is depressed, and thus when the customer places an empty bottle in one compartment and depresses the same downwardly into the casing, the other carrier will be elevated. When the milkman in the morning places a filled bottle in the other compartment and depresses the same into the casing, the carrier on which the empty bottle is resting will be elevated and the empty bottle raised out of the casing, whereby it may be readily grasped and removed.

The upper side portions 21 of the supporting frame 14 extend above the central portion of the casing and to these upward extensions 17 are hingedly connected covers 22 adapted to close the upper ends of the compartments 12 of the casing. These covers 22 are controlled by light coil springs 23 sufficient to normally hold the covers in closed position and flexible enough to permit the covers to be easily and quickly raised independent of one another.

As illustrated in Figure 5, the invention is readily susceptible to extension in order that the casing and the arrangements within the casing may accommodate four bottles, the casing $10^a$ being illustrated as providing a pair of compartments $12^a$ at each side thereof. With this arrangement the two bottle carriers will of course be doubled, each carrier having a pair of bottle rests $18^a$ as shown.

My invention as thus illustrated and described, is obviously a material benefit in so far as the sanitary support of milk bottles is concerned, and will permit of the delivery of milk bottles in a sanitary condition both from the dealer to the consumer, and also from the consumer to the dealer.

I claim:—

1. A milk bottle holder including a casing having vertically disposed upwardly opening bottle compartments, a frame within the casing intermediate said compartments having vertically grooved opposing side portions, bottle carriers within the compartments having portions thereof slidably disposed in said grooves, a roller within the upper portion of the frame, a flexible connection extending over the roller and joined at its ends to said carriers whereby to constrain the latter to simultaneous movement in relatively opposite directions, said frame having extensions projecting above the casing, and spring controlled cover members for the compartments hinged to the said upper extensions of the frame.

2. A bottle holder including an upwardly opening casing, a frame within the casing dividing the same into compartments and secured to the casing to brace and support the latter, bottle carriers slidable vertically in said compartments and having guided movement in said frame, connections between said carriers for constraining the same to simultaneous movement in relatively opposite directions, and cover members in movable connection with the frame to overlie the casing and normally close the upper ends of said compartments.

In testimony whereof I have affixed my signature.

HASTINGS C. REED.